United States Patent
Ash et al.

(10) Patent No.: US 6,648,763 B2
(45) Date of Patent: Nov. 18, 2003

(54) REDUCTION OF AXIAL THRUST REACTION IN TOOTHED SHEAR-TYPE FLEXIBLE COUPLINGS

(75) Inventors: Sean T. Ash, New Berlin, WI (US); Glenn C. Pokrandt, Auburn, AL (US)

(73) Assignee: The Falk Corporation, Milwaukee, WI (US)

(*) Notice: Subject to any disclaimer, the term of this patent is extended or adjusted under 35 U.S.C. 154(b) by 0 days.

(21) Appl. No.: 09/953,399

(22) Filed: Sep. 13, 2001

(65) Prior Publication Data

US 2002/0142849 A1 Oct. 3, 2002

Related U.S. Application Data

(60) Provisional application No. 60/232,999, filed on Sep. 14, 2000.

(51) Int. Cl.[7] .................................................. F16D 3/54
(52) U.S. Cl. .......................................... 464/87; 464/73
(58) Field of Search .............................. 464/87, 73, 74, 464/75, 88, 93, 137, 147; 403/220, 225, 227, 11

(56) References Cited

U.S. PATENT DOCUMENTS

| | | | | | |
|---|---|---|---|---|---|
| 3,396,556 A | * | 8/1968 | Giegerich | ............... | 464/73 |
| 3,636,729 A | * | 1/1972 | Patel | ............... | 464/73 |
| 3,884,049 A | * | 5/1975 | Pauli | ............... | 464/182 |
| 6,159,102 A | * | 12/2000 | Hennessey et al. | ............... | 464/154 |

* cited by examiner

*Primary Examiner*—Lynne H. Browne
*Assistant Examiner*—Kenneth Thompson
(74) *Attorney, Agent, or Firm*—Stephen G. Mican

(57) ABSTRACT

A flexible coupling having a generally cylindrical flexible element with a plurality of generally radial element teeth that are engaged by a plurality of generally radial hub teeth that penetrate generally radial element tooth faces on the element teeth, with the hub teeth arranged around generally radial hub faces of generally cylindrical shaft hubs and means for reducing axial loading of drive shafts attached to the hubs under load.

6 Claims, 4 Drawing Sheets

SECTION A-A

REDUCTION OF AXIAL THRUST REACTION IN TOOTHED SHEAR-TYPE FLEXIBLE COUPLINGS

CROSS REFERENCE TO RELATED APPLICATIONS

This Application claims the benefit of the filing date for prior filed Provisional Application Ser. No. 60/232,999, filed Sep. 14, 2000.

BACKGROUND OF THE INVENTION

Flexible couplings are used to connect and transmit power between rotating shafts. A flexible coupling of the toothed shear-type comprises a flexible element, typically elastomeric, that couples non-overlapping teeth of two adjacent radially aligned shaft hubs. A short gap between the teeth of the hubs allows clearance for a degree of angular misalignment.

In fact, under load such couplings apply a significant amount of compression to the teeth, thereby making them act as "combination shear and compression" couplings. Compared to other types of flexible shear-type couplings, they exert as much as fifty percent more axial thrust load on the coupled shafts, thereby increasing the shaft bearing axial load and bearing wear.

SUMMARY OF THE INVENTION

According to the invention, a toothed shear-type flexible coupling has clearance provided between the hub faces and the tooth faces of the flexible element to prevent significant axial thrust loading from being transmitted to the hubs under load. Small centring tabs are added on the hub faces between the hub teeth to align the flexible element between the hubs. Axial thrust loading is minimised by changing its primary source from one due to twisting of the flexible element and contact on the hub faces to compression of the element and contact on the tab faces.

According to one embodiment of the invention, a flexible coupling has a generally cylindrical flexible element with a plurality of generally radial element teeth that are engaged by a plurality of generally radial hub teeth that penetrate generally radial element tooth faces on the element teeth, with the hub teeth arranged around generally radial hub faces of generally cylindrical shaft hubs and means for reducing axial loading of drive shafts attached to the hubs under load that comprises a plurality of generally radial centring tabs arranged around the hub faces between the hub teeth, the tabs having generally radial tab faces that contact the element tooth faces.

DESCRIPTION OF THE EMBODIMENT

Figure 1:
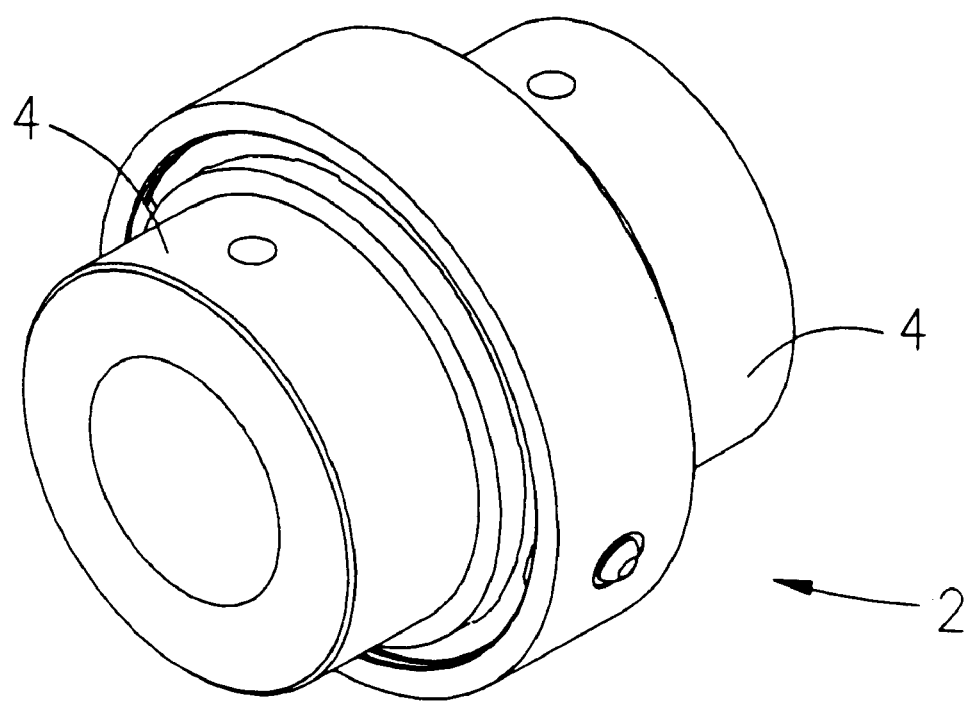
FIG. 1 shows perspective view of a typical toothed shear-type flexible coupling that may incorporate the invention.
Figure 2:
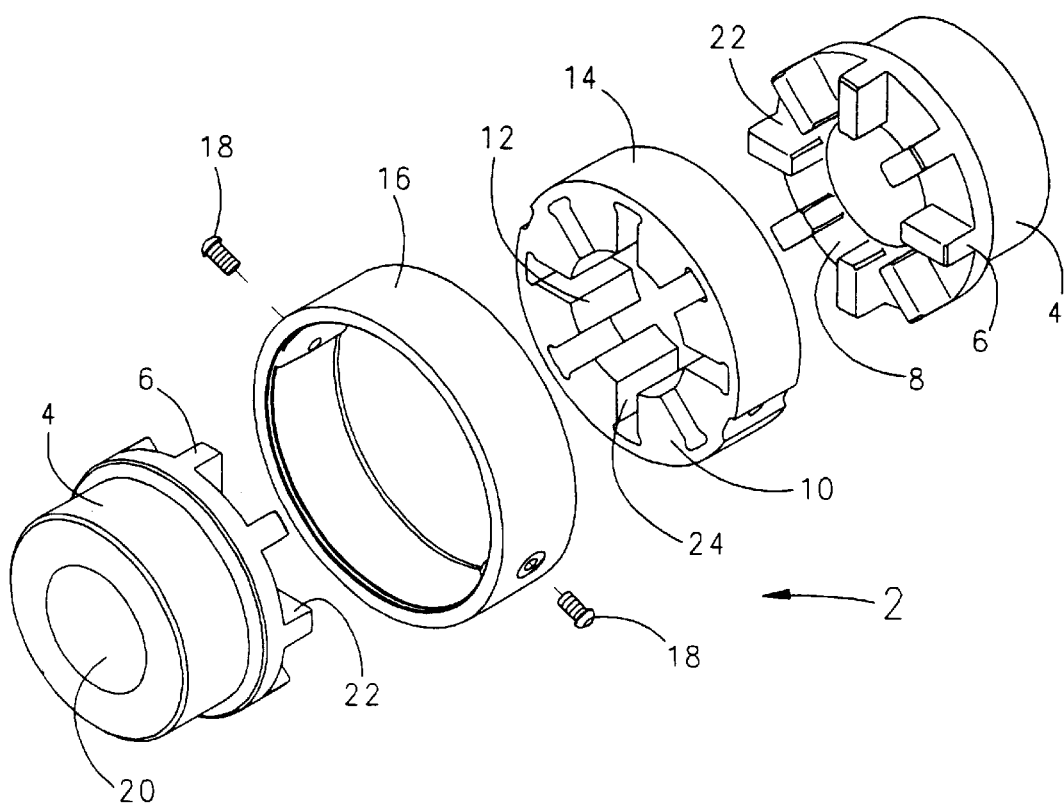
FIG. 2 shows an exploded perspective view of the coupling shown in FIG. 1 that has hubs with a prior art design.

Referring to the drawings, wherein like numbered items identify like or similar parts throughout the views, FIG. 1 shows a perspective view of a typical toothed shear-type flexible coupling 2 that may incorporate the invention and FIG. 2 shows an exploded perspective view of the coupling 2 shown in FIG. 1 that has hubs with a prior art design. The coupling 2 comprises two generally cylindrical shaft hubs 4 that each have a plurality of generally radial hub teeth 6 that are arranged along a generally radial hub face 8 that penetrate a corresponding generally radial tooth face 10 to engage corresponding generally radial element teeth 12 formed in a generally cylindrical, flexible, typically elastomeric, element 14. The element 14 typically has a generally annular coupling cover 16 that encapsulates it. The coupling cover 16 is typically fastened to the element 14 by a plurality of cover fasteners 18, such as screws. Each of the shaft hubs 4 has a hub bore 20 for accepting a corresponding drive shaft (not shown).

When power is applied to one of the drive shafts, its corresponding hub 4 transfers torque from hub tooth flanks 22 on the hub teeth 6 to corresponding element tooth flanks 24 on the element teeth 12 of the element 14. Torque is then transmitted from the tooth flanks 24 on the element teeth 12 of the element 14 by shear of the element teeth 12 to the tooth flanks 22 on the hub teeth of the other hub 4 to drive the other drive shaft.

In practice, the hubs 4 are coupled to the element 14 with a minimum of clearance between the hub faces 8 and tooth faces 10, typically on the order of 0.015 to 0.020 inch. This minimal clearance is needed to minimise the twisting effect of the element 14 under load. Unfortunately, with increasing load the element 14 does begin twisting and bulging, and the twisting and compression of the element teeth 12 cause the tooth faces 10 to contact and push against the hub faces 8, thereby creating axial loading on the drive shafts.

It has been observed that contact between each hub face 8 and tooth face 10 is heavy near each hub tooth flank 22 and element tooth flank 24 that contact under load. The primary source of axial thrust thus appears to be due to twisting and bulging of the element 14 with resulting contact on the hub faces 8.

Figure 3:
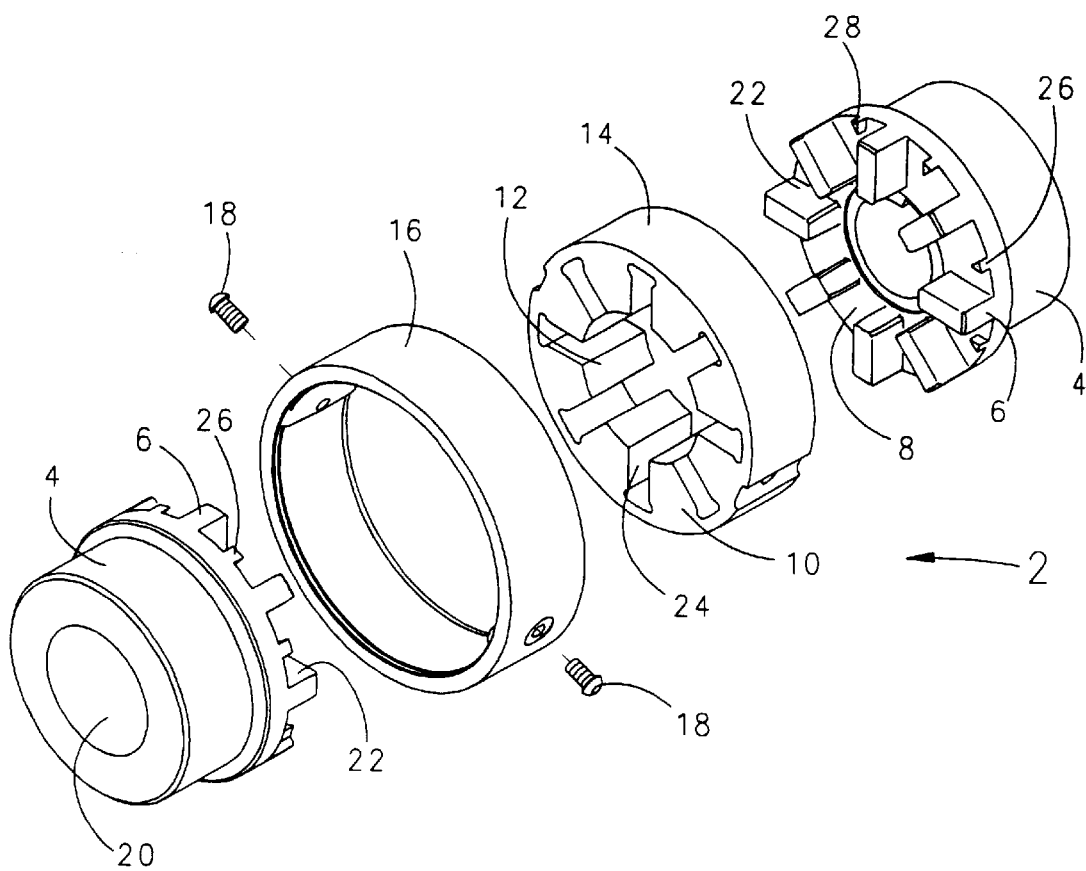
FIG. 3 shows an exploded perspective view of the coupling shown in FIG. 1 that has hubs with a design according to the invention.
Figure 4:
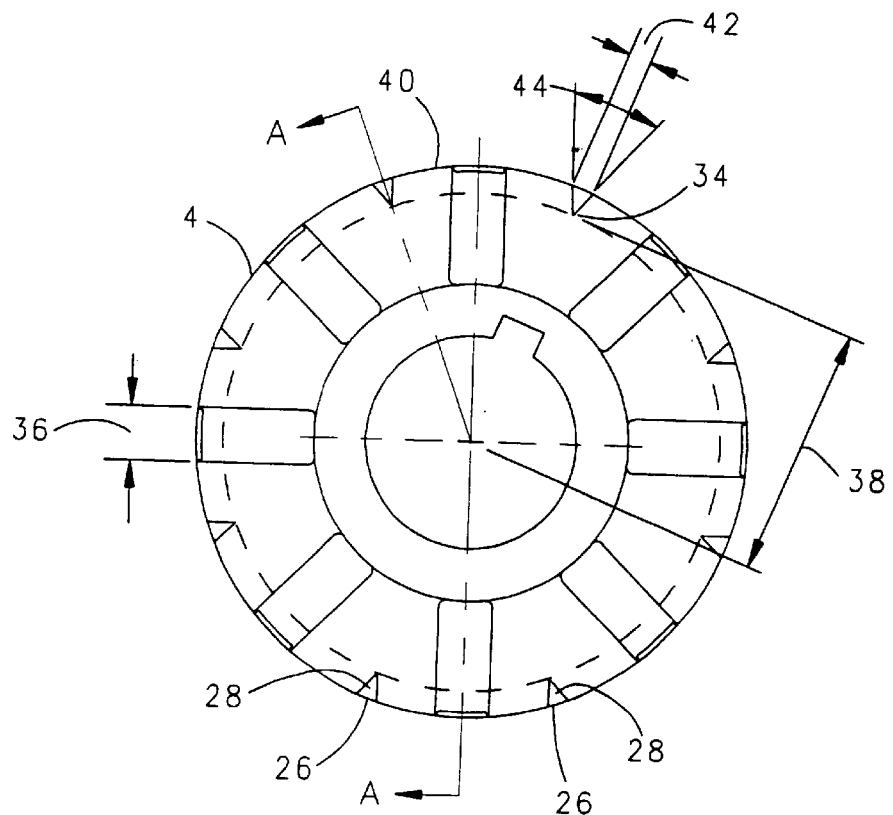
FIG. 4 is an end view of a hub with a design according to the invention.
Figure 5:
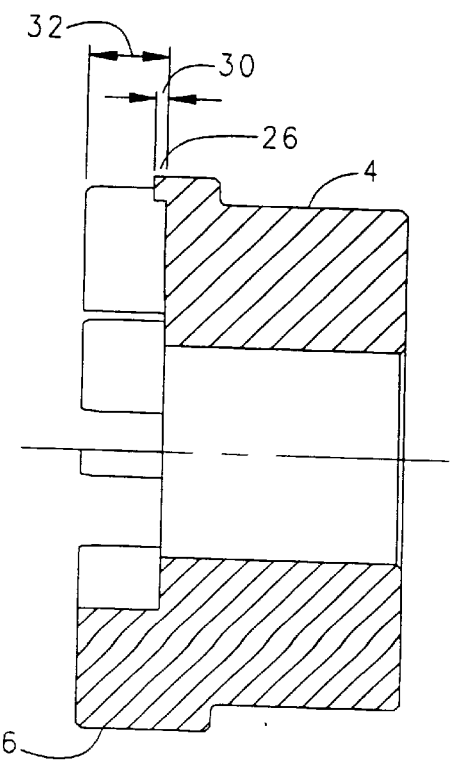
FIG. 5 is a cut-away side view of the hub shown in FIG. 4 with a design according to the invention.

FIG. 3 shows an exploded perspective view of the coupling 2 shown in FIG. 1 that has hubs 4 with a design according to the invention. FIG. 4 is an end view of a hub 4 with a design according to the invention. FIG. 5 is a cut-away side view of the hub 4 shown in FIG. 4 with a design according to the invention. Each of the hubs 4 has a plurality of generally radial centring tabs 26 that are arranged around its hub face 8, and the tabs 26 each have generally radial tab faces 28 that contact the tooth faces 10 of the element 14. The tabs 26 are positioned on the hub face 8 of each hub 4 between the hub teeth 6, and preferably there is one tab 26 between each adjacent set of hub teeth 6.

As most clearly shown in FIG. 5, the tabs 26 have axial thicknesses or tab heights 30 that are sufficient to minimise or eliminate contact between each hub face 8 and tooth face 10 under load. In practice, the tab heights 30 are preferably on the order of approximately 0.10 to 0.15 of the axial thickness or hub tooth length 32 of the hub teeth 6. The tab faces 28 may have any desired shape, such as round, rectangular or triangular. Approximately triangular shapes are generally preferred for the tab faces 28 from the standpoint of machinability, and the tabs 26 shown in FIGS. 4 and 5 have tab faces 28 of this approximate shape.

As most clearly shown in FIG. 4, the tabs 26 have tab radii 34 that are preferably on the order of approximately 0.10 to 0.20 of the hub tooth width 36 of the hub teeth 6. The tabs 26 have inner radii 38 that are preferably in the range of approximately 0.50 to 0.95 of half the outer diameter 40 of the hub 4. The tabs 26 have tab widths 42 that are preferably in the range of approximately 0.10 to 1.0 of the hub tooth width 36 of the hub teeth 6. The tabs 26 have tab angles 44 that are preferably in the range of approximately 0 to 60 degrees.

The modified hubs 4 with tabs 26 allow the element 14 to twist under torque load with minimal or no contact against the hub faces 8. It is believed that the tabs 26 have changed the primary source of axial thrust from one due to twisting of the element 14 and contact on the hub faces 8 to compression of the element 14 and contact on the tab faces 28. Based upon testing of a typical coupling 2 with an element 14 comprising an elastomeric material, the tabs 26 reduced axial thrust load by forty to fifty percent over a torque range of 1000 in.-lb. to 2700 in.-lb. From zero to 700 in.-lb. the axial thrust load was negligible. Without the tabs 26, axial thrust was 100 lb. at 700 in.-lb. of torque.

Thus there has been described herein a flexible coupling having a generally cylindrical flexible element with a plurality of generally radial element teeth that are engaged by a plurality of generally radial hub teeth that penetrate generally radial element tooth faces on the element teeth, with the hub teeth arranged around generally radial hub faces of generally cylindrical shaft hubs and means for reducing axial loading of drive shafts attached to the hubs under load. It should be understood that the embodiment described above is only one illustrative implementation of the invention, that the various parts and arrangement thereof may be changed or substituted, and that the invention is only limited by the scope of the attached claims.

What is claimed is:

1. A flexible coupling having a generally cylindrical flexible element with a plurality of generally radial element teeth that are engaged by a plurality of generally radial hub teeth that penetrate generally radial element tooth faces on the element teeth, with the hub teeth arranged around generally radial hub faces of generally cylindrical shaft hubs and means for reducing axial loading of drive shafts attached to the hubs under load that comprises:

a plurality of generally radial centring tabs arranged around the hub faces between the hub teeth, wherein the tabs have generally radial triangular tab faces that contact the element tooth faces.

2. The flexible coupling described in claim 1, wherein the tabs have tab heights that are in the range of approximately 0.10 to 0.15 of the lengths of the hub teeth.

3. The flexible coupling described in claim 1, wherein the tabs have tab radii that are in the range of approximately 0.10 to 0.20 of the widths of the hub teeth.

4. The flexible coupling described in claim 1, wherein the tabs have inner radii that are in the range of approximately 0.50 to 0.95 of half the outer diameter of the hub.

5. The flexible coupling described in claim 1, wherein the tabs have tab widths that are in the range of approximately 0.10 to 1.0 of the widths of the hub teeth.

6. The flexible coupling described in claim 1, wherein the tabs have tab angles that are in the range of approximately 0 to 60 degrees.

* * * * *